Figure 1:
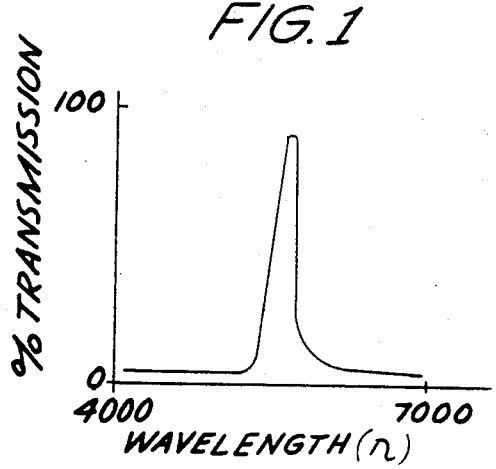
Figure 2:
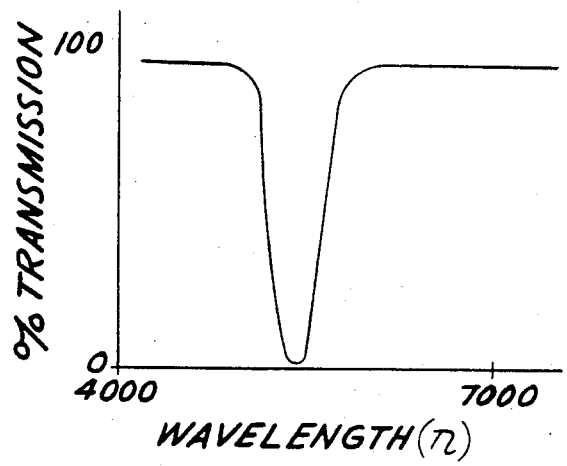
Figure 3:
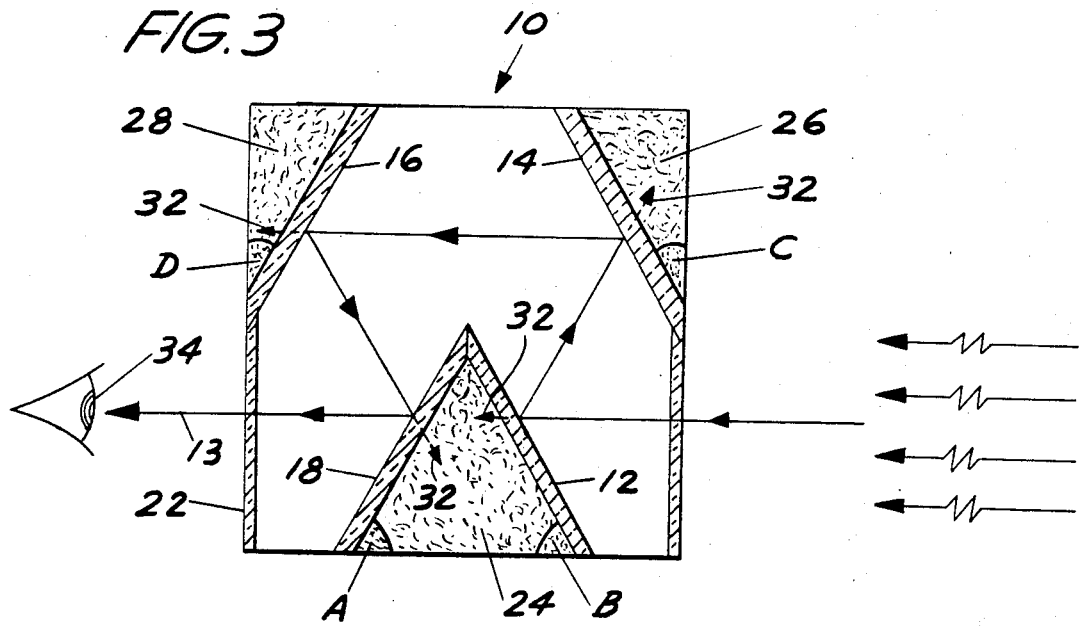
Figure 4:
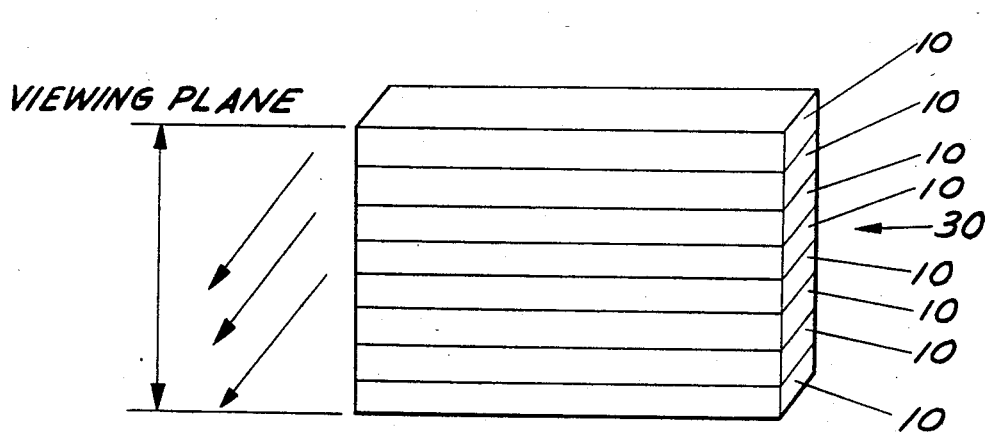

United States Patent [19]

Sarna

[11] 3,792,916
[45] Feb. 19, 1974

[54] ANTI-LASER OPTICAL FILTER ASSEMBLY

[75] Inventor: Donald S. Sarna, Warren, Mich.

[73] Assignee: The United States of America as represented by the Secretary of the Army, Washington, D.C.

[22] Filed: Feb. 25, 1969

[21] Appl. No.: 802,015

[52] U.S. Cl. .............. 350/163, 350/316, 350/290, 356/112, 331/94.5 A
[51] Int. Cl. ........................................... G02b 5/28
[58] Field of Search ... 350/311, 316, 318, 166, 163, 350/313; 356/106, 112; 331/94.5 A

[56] References Cited
UNITED STATES PATENTS 3,358,243  12/1967  Collins et al. ............... 331/94.5 OC
3,267,807  8/1966   Swope et al. .................. 350/316

OTHER PUBLICATIONS

Baumerster, "Multilayer Optical Filters," 4/64, pg. 68–90, Instit. of Optics.

*Primary Examiner*—Malcolm F. Hubler
*Assistant Examiner*—N. Moskowitz
*Attorney, Agent, or Firm*—Edward J. Kelly; Herbert Berl

[57] ABSTRACT

A filter assembly for selectively removing preselected individual emission lines of laser energy from the visible spectrum comprising at least one pair of Fabry-Perot type filters which transmit laser energy emissions for dissipation in the filter assembly and reflect harmless radiation for transmission through the assembly. A plurality of these filter assemblies parallelly juxtaposed are also used to provide a filter screen for protection against laser energy emissions.

2 Claims, 4 Drawing Figures

PATENTED FEB 19 1974 3,792,916

SHEET 2 OF 2

DONALD S. SARNA
INVENTOR.
Harry M. Saragovitz
BY Edward J. Kelly
Herbert Berl
Arthur L. Girard
ATTORNEYS

ANTI-LASER OPTICAL FILTER ASSEMBLY

The invention described herein may be manufactured and used by or for the United States Government for governmental purposes without payment to me of any royalty thereon or therefor.

The present invention relates to optical filters and more particularly to a filter assembly utilizing the reflective and transmissive characteristics of Fabry-Perot type filters to protect the eyes against laser energy level emissions occurring in the visible range of the electromagnetic spectrum.

The primary characteristic of optical laser or maser radiation is the emission of beams of very intense collimated light or other radiant energy of one wavelength or a very narrow band of wavelengths. As is well known, beams produced by such devices can be very dangerous to the human eye or photosensitive equipment even when exposure thereto is only for very brief periods on the order of small fractions of a second. Hence, there exists a need for a filter or other means for protecting personnel and equipment from such dangerous emissions.

Most recent attempts to provide the type of protection described above have utilized methods involving direct absorption of the unwanted high-energy laser type radiations by a single simultaneously transmitting medium. Such absorption techniques are valuable and useful for protection against many forms of laser emissions over an extended range of wavelengths, particularly at the infra-red portion of the spectrum, i.e., about 7,000 A as in the case of the radiation lines produced by the ruby laser (6,943 A ). However, in cases where the wavelengths of the laser emissions lie within the visible spectrum or harmonics of such emissions lie within the visible spectrum such absorption techniques have definite shortcomings. These arise from the tendencies of absorption-type filters to severely attenuate those wavelengths neighboring the preferentially absorbed wavelength of the laser emission thus causing substantial reduction in the amount of visible light and hence the actual visibility of the observer or receiver.

Furthermore, such absorption type filters have a tendency to heat up and ultimately crack due to the high energy build up caused by continuous absorption of laser energy emissions for a period of time.

Devices have also been developed which use multilayer vacuum deposited dielectric coatings to reflect a band of energy around and including the undesirable high energy laser emission. This type of filter device is likewise suitable for application in the edge regions of the detector sensitivity response, but is not practical for energies falling near the center of the eye response curve which is normally the point of maximum sensitivity.

The instant invention will operate effectively in any region of the eye or photosensitive detector response curve with a minimum of absorption or back-reflection of desired wavelengths.

It is therefore an object of the present invention to provide a filter assembly for use in protecting the eye or photo-sensitive equipment from injury due to laser energy emissions in the visible range with only minimal reduction in transmission of visible light to the observer or photosensitive device.

It is another object to provide an apparatus of the type described above which makes use of the transmissive rather than absorptive filter techniques to accomplish this protection.

Other objects and advantages will be made clear when the following description is read in conjunction with the accompanying drawings of which:

FIG. I is a plot of percent transmission versus wavelength of light for a Fabry-Perot-type filter of the kind utilized in the filter assembly of the present invention;

FIG. II is a plot of percent transmission versus wavelength for a filter assembly of the present invention;

FIG. III is a cross sectional view of a preferred embodiment of the filter assembly of the present invention; and FIG. IV is a representation of a filter screen constructed in accordance with a preferred embodiment of the present invention.

Broadly, the present invention utilizes a novel arrangement of Fabry-Perot-type filters to achieve exclusion of unwanted laser emissions with a maximum transmission of visible, safe and desirable wavelengths. The technique attains this end through the use of transmission to eliminate the undesired wavelengths and reflection of the harmless, useful and necessary visible wavelengths.

The basic principle involved in the present invention is the use of Fabry-Perot-type filters which have a characteristic transmission curve of the type shown in FIG. I. Basically, the filter is made by vacuum depositing a spacer dielectric layer of $N\lambda_o/2$ c$\lambda_o$ being laser energy wavelength which is to be transmitted by the filter) between two partially transmitting mirrors which in the most effective filters are of dielectric construction, i.e., half silvered glass or other dielectric plates. The spacer dielectric layer and partially reflecting mirrors can consist of almost any of the conventional dielectric materials used in optical applications. These include: glass, Magnesium Fluoride, Zinc Sulfide, Cryolite, Cerium Fluoride, Silicon Monoxide, Titanium Dioxide, etc. Extensive information on the design and characteristics of this type of filter can be found in the open literature including "Vacuum Deposition of Thin Films," L. Holland, "Journal of the Optical Society of America," Jan., 58, Vol. 48 No. 1. In the particular samples evaluated during the development of the present filter assembly Magnesium Fluoride was utilized as the spacer dielectric and Zinc Sulfide and Magnesium Fluoride as the materials for the partially reflecting mirrors.

Since no absorption occurs if all dielectric materials are used, the reflectance curve of this kind of filter is the inverse of the transmission curve shown at FIG. I, i.e., the filter will reflect all wavelengths except $\lambda_o$ and those near $\lambda_o$ which it will transmit. The width of this transmission band is controlable by varying the quarter-half wave stack arrangements, the N in the spacer layer ($N\lambda_o/2$) and the indexes of refraction of the dielectrics. In the present application, $\lambda_o$ is the undesired laser emission which will be transmitted through the Fabry-Perot filter where it will subsequently be absorbed by a suitable absorber and heat sink, while the balance of the wavelengths will be reflected and, using the structure disclosed below be conveyed in all but undiminished intensity to the eye of the viewer or a piece of photosensitive equipment.

By using Fabry-Perot-type filters as mirrors in a geometric arrangement such as that shown and described below, the resultant transmission of the visible spectrum through the filter assembly will approximate the curve shown in FIG. II, i.e., the filter assembly making use of the principle of reflection of the desired wavelengths from the filter material and transmission of the undesired wavelength through these same materials for ultimate absorption or dissipation yields a curve wherein radiation of substantially all wavelengths except those near the laser ($\lambda_o$) is transmitted through the assembly while the undesired wavelength is dissipated therein as shown by the curve of FIG. II.

As shown in the preferred embodiment of FIG. III, the filter assembly 10 comprises two pair of Fabry-Perot-type filters each of said pair comprising an initial filter 12 and 16 and a final filter 14 and 18 oriented such that when electromagnetic radiation (in this case visible light indicated by the arrows in FIG. III) entering the assembly impinges upon the front surface 11 of initial filter 12, the harmless visible portion of the radiation is reflected (according to the principles described above) to the front surface 15 of final filter 14, while the wavelengths of the harmful laser energy emissions (indicated by the broken line arrow 32) which enter with the other wavelengths are transmitted by the filter to be absorbed and the energy thereof dissipated by the absorber and heat sink 24 which lies contiguous to rear surface 13 of initial filter 12. This same process goes on at each of the filter elements until ultimately after reflection from final filter 18 of the second pair of filters the harmless radiation passes out of the assembly and on to the eye of the viewer or the photosensitive receiver.

The result achieved with the paired filter structure of FIG. III can be attained using only a single pair of the Fabry-Perot-type filters or multiple pairs thereof. The essential elements are that there be at least two (i.e., a pair) of the Fabry-Perot-type filters in spaced relationship such that when radiation impinges upon the initial filter of the pair the harmless visible wavelengths are reflected to the second or final filter of the pair and thence enter to another pair of filters for further filtering as shown in FIG. IV or to the eye of a viewer or the photocell of a photosensitive instrument, while the undesired laser energy radiation is substantially all transmitted through the initial filter where it is absorbed and dissipated by a suitable medium or mediums. Any portion of the laser radiation which might be reflected by the initial filter is transmitted by the second or final filter of the pair and in turn absorbed and dissipated by a suitable medium mounted contiguous to the rear surface up said second or final Fabry-Perot-type filter. The other filter members shown in FIG. III serve to increase the spectrally selective density of the filter assembly to achieve sufficient attenuation of the dangerous emissions prior to the radiation impinging upon the eye.

Alternatively the second pair of filters might be designed to transmit a second wavelength of laser energy emissions and hence supplement the filtering capabilities of the first pair of Fabry-Perot-type filters and provide a broader range of protection.

As the radiation is reflected from filter to filter within the assembly, the effect thereof is to cumulatively subtract the unwanted wavelength or band of wavelengths from the radiation. The absorbers and heat sinks 24, 26 and 28 which are shown in FIG. III as relatively large quantities of metal filings need not be of this type and may consist merely of thin absorber layers coated on the filter as described in the discussion of a preferred embodiment below.

The actual configuration of the assembly may also change so long as the various filters are oriented such that the visible wavelengths are properly propagated through the assembly without loss of any substantial harmless portion thereof. Thus, the angles A, B, C, and D may vary according to the particular shape and size the designer wishes to give the filter and the direction in which he wishes the visible light transmitted and no criticality is attached to either the angular relationships of the filters or the distances therebetween.

According to the preferred embodiment, the various Fabry-Perot-type filters consist entirely of dielectric materials such as Magnesium Fluoride and Zinc Sulfide which provide maximum reflection of the desired wavelengths with maximum transmission and hence effective subtraction of the undesired wavelengths. The actual width of the band of wavelengths which are transmitted is primarily dependent upon the exactness and uniformity of the thickness of the middle dielectric layer of the filter. It is of course most desirable to reduce the band width as close as possible to the actual wavelength of the laser emission so as to maximize the band or range of visible light transmitted by the filter assembly. The bandwidth required will be influenced by the angular acceptance cone at the input to the assembly it will be necessary to take into account the shifting of the transmission band for non-normal incidence to the filter assembly. This is accomplished by increasing the width of the transmission band so it will always contain the laser wavelength $\lambda_o$ no matter what angle the beam has within the acceptance cone.

In another preferred ambodiment a modified version of which is shown in FIG. III and which was actually used to filter laser emissions of 5,300 A, the absorber and heat sink material consisted simply of a thin coat of a flat black paint as a dielectric absorber of sufficient thickness that no reflection of the undesired radiation which was trasmitted by the filter proper would occur. Broadly, this requires a dielectric substrate whose thickness is macroscopic and which supports the filter and the heat sink. The black paint can, if necessary, be backed up by a conventional metal heat dissipator (such as the metal filings used in the Figure) if this is found necessary due to the utilization of extrememly high energy radiations or lengthy exposure to such radiations. The most important characteristics of the absorber are however: 1) that it not reflect the harmful radiation; and 2) that it be capable of receiving and dissipating incoming energy without deterioration.

In so far as the configuration of the preferred embodiment is concerned, it has been found advantageous primarily due to space considerations to use a 60°–30° arrangement, i.e., angles A and B are 60° while angles C and D are 30°. This configuration provides the most compact functional arrangement of the filter elements, but is in no manner critical, the user being completely free to rearrange the filter elements in any configuration desireable in his particular application and the confines of his physical location.

The members 20 and 22 of the filter assembly which may be omitted entirely can consist of glass, some clear, non-absorbing dielectric material, or some selectively absorptive filter material such as Schott Glass as circumstance may demand. The space occupied by these two members may for that matter be left open although the inclusion of a clear cover therein offers protection against dust, breakage, etc.

Thus, it should be clear that the critical aspect of this portion of the invnetion lies in the use of Fabry-Perot-type filters in a filter assembly of the type described above and in neither the materials used of the exact angular or spatial displacements thereof.

A second aspect of the present invention comprises a filter screen made up of a series of parallelly juxtaposed filter assemblies of the type just described. Such an apparatus is shown in FIG. IV, wherein the filter screen 30 comprises, in this case, a vertically stacked series of elongated filter assemblies 10, each of which transmits all of the visible spectrum except the laser emission wavelengths which are "absorbed" and dissipated by the individual assemblies. Such a screen could of course be constructed using a horizontal alignment of the elongated filter assemblies or a mosaic effect achieved through the use of horizontally and vertically juxtaposed cube or short rectangular filter assemblies.

Whether used individually or organized into screens, the filter assemblies can be used individually or arranged in series with each of the consecutive assemblies absorbing a different very narrow wavelength band such that a number of different emissions can be absorbed and a broader range of protective bands established.

As a further modification of the invention disclosed herein, the filter assembly can consist of a plurality of "mirrors" which form a periscope type of arrangement for viewing at angles or around corners or obstacles with only the initial and the final "mirrors" of the assembly being Fabry-Perot-type filters which serve to subtract harmful laser energy emissions from the visible spectrum.

I wish it to be understood that I do not desire to be limited to the exact details of construction shown and described, for obvious modifications will occur to a person skilled in the art.

I claim:

1. Optical mechanism for removing dangerous laser energy wavelengths from a visible incident beam, while transmitting other non-damaging wavelengths in the beam to the human eye or other photosensitive target; said optical mechanism comprising first Fabry-Perot filter means arranged to receive an incident visible beam containing the dangerous laser energy wavelengths and the non-dangerous wavelengths; said first Fabry-Perot filter means being operable to produce a first reflected ray containing primarily non-damaging wavelengths and some damaging wavelengths, and a first transmitted ray containing primarily dangerous wavelengths; first light absorption means operable to intercept the first transmitted ray to absorb the dangerous wavelengths contained therein; second Fabry-Perot filter means arranged to receive the reflected ray from the first filter means; said second Fabry-Perot filter means being operable to produce a second reflected ray containing essentially only non-damaging wavelengths, and a second transmitted ray containing dangerous wavelengths; second light absorption means operable to intercept the second transmitted ray to absorb the dangerous wavelengths contained therein; and means for directing the second reflected ray to the human eye or other photosensitive target.

2. The mechanism of claim 1 wherein each Fabry-Perot filter means comprises a pair of Fabry-Perot filters arranged so that the reflected ray from one filter constitutes the incident ray for the other filter.

* * * * *